United States Patent
Lee et al.

(10) Patent No.: US 6,885,797 B2
(45) Date of Patent: Apr. 26, 2005

(54) ZERO CLEARANCE RECEPTACLE DESIGN FOR SINGLE MODE OPTICAL FIBER CONNECTORS

(75) Inventors: James C. Lee, Plymouth, MN (US); Raymond W. Blasingame, Richardson, TX (US); Bo Su Chen, Garland, TX (US); Bernard Q. Li, Plymouth, MN (US); James D. Orenstein, Duncanville, TX (US)

(73) Assignee: Finisar Corporation, Sunnyvale, CA (US)

( * ) Notice: Subject to any disclaimer, the term of this patent is extended or adjusted under 35 U.S.C. 154(b) by 221 days.

(21) Appl. No.: 10/347,789

(22) Filed: Jan. 22, 2003

(65) Prior Publication Data

US 2004/0141694 A1 Jul. 22, 2004

(51) Int. Cl.⁷ .............................. G02B 6/26; G02B 6/42
(52) U.S. Cl. .............................. 385/52; 385/39; 385/50; 385/53; 385/55
(58) Field of Search .............................. 385/15, 39, 50, 385/52, 53, 55, 76, 77, 78, 83, 84, 88, 92, 93

(56) References Cited

U.S. PATENT DOCUMENTS

| | | | | |
|---|---|---|---|---|
| 6,069,991 A | * | 5/2000 | Hibbs-Brenner et al. | ..... 385/50 |
| 6,088,498 A | * | 7/2000 | Hibbs-Brenner et al. | ..... 385/52 |
| 6,404,960 B1 | * | 6/2002 | Hibbs-Brenner et al. | ..... 385/52 |
| 2002/0181882 A1 | * | 12/2002 | Hibbs-Brenner et al. | ..... 385/52 |

* cited by examiner

*Primary Examiner*—Frank G. Font
*Assistant Examiner*—Mary El-Shammaa
(74) *Attorney, Agent, or Firm*—Workman Nydegger

(57) ABSTRACT

A zero-clearance receptacle for single mode optical fiber couplers. The zero-clearance receptacle includes an internally fluted V-groove formed by internally extending legs. The zero-clearance receptacle uses the fundamental action of the V-groove to accurately locate an optical fiber ferrule inserted into the zero-clearance receptacle in the radial direction. The zero-clearance receptacle further includes a slot that receives a biasing element, such as a spring, that biases the optical ferrule against the V-groove legs. This enables accurate positioning of an optical fiber in the optical ferrule relation to an optical element such as a VCSEL or a photoreceptor. The zero-clearance receptacle beneficially fits into an optical coupler, which may have a lens.

22 Claims, 2 Drawing Sheets

ZERO CLEARANCE RECEPTACLE DESIGN FOR SINGLE MODE OPTICAL FIBER CONNECTORS

CROSS-REFERENCE TO RELATED APPLICATIONS

Not applicable.

BACKGROUND OF THE INVENTION

1. Field of the Invention

The present invention relates to optical connectors.

2. Discussion of the Related Art

Coupling optical elements, such as Vertical Cavity Surface Emitting Lasers (VCSELs), with optical fibers is a relatively difficult, time consuming, and expensive task. One reason for this is that optical coupling requires precise physical alignment between the optical fiber and the optical element. Complicating the problem is that the physical alignment must remain accurate over both time and temperature. For example, when coupling an optical element to a single mode optical fiber a physical alignment that is accurate within a micron or so radially, and between 10 and 15 microns axially, over the full temperature range and over the life of the product can be required.

Optical connectors are used to couple optical fibers to optical elements. A primary task of an optical connector is to couple optical signals between elements with minimal signal loss. As previously noted, an optical connector must provide for precise physical alignment in the axial and radial directions. Various physical alignment techniques have been tried with varying degrees of success. Prior art approaches include molded lens coupling, butt coupling, and butt coupling with V-groove alignment. While generally successful, such prior art methods are, as stated, relatively difficult and expensive to implement.

Compounding physical alignment problems is the need for plug-in connectors that can be made and unmade numerous times, all while meeting the required alignment precision. In practice, to minimize signal losses stemming from imprecise radial alignment, most plug-in type optical connectors relay light from a first optical element, such as a VCSEL light source, into a single mode fiber (SMF) stub. That SMF stub is terminated, polished, and inserted into a split sleeve. The SMF stub is usually comprised of a ceramic material having a coefficient of thermal expansion that closely matches the coefficient of thermal expansion of the optical fiber. The SMF stub is often captured by a split sleeve assembly within an optical connector such that the plugged-in optical fiber is accurately positioned relative to the end of an optical fiber that is fixed within the SMF stub within the optical connector. Conventionally, any radial movement during plug-in is taken up by the flexibility of the split sleeve. In practice, the split sleeve is optically coupled to the optical element via a conventional butt or lens-coupling technique.

While the SMF stub is amenable to batch ferrule assembly and polishing, it is a small and relatively delicate part that can be difficult to handle in automated machinery. Thus, the SMF stub approach does not provide an economical solution to precision optical alignment of an optical element with an optical fiber.

Therefore, a new optical coupler would be beneficial. Even more beneficial would be a new optical coupler that enables accurate alignment of optical elements. Still more beneficial would be a new optical coupler having an optical receptacle that enables plug-in connections that accurately align an optical element relative to an optical fiber. Beneficially, such a plug-in optical coupler would include an optical receptacle that provides zero clearance tolerance for the radial alignment of an optical element relative to an optical fiber over time and temperature. Preferably, such an optical coupler would be low-cost and useable by relatively untrained assembly workers.

SUMMARY OF THE INVENTION

Accordingly, the principles of the present invention provide for zero-clearance optical receptacles that enable plugable optical couplers that provide highly accurate coupling of single mode optical fibers with optical elements, plug-in after plug-in, and that substantially obviate one or more of the problems due to limitations and disadvantages of the related art. Such a zero-clearance optical receptacle is beneficially spring loaded to enable consistent, accurate alignment. Furthermore, the zero-clearance optical receptacle beneficially is part of an optical coupler that couples an optical element (such as a VCSEL or a photo-sensor) to a single mode optical fiber that is retained by an optical ferrule.

A zero-clearance optical receptacle according to the principles of the present invention includes an internally fluted V-groove. Such zero-clearance optical receptacles are beneficially dimensioned to receive an optical fiber ferrule on two surfaces that define the V-groove. The V-groove positions the center of the optical fiber ferrule at a defined, rigidly fixed, consistent position, plug-in after plug-in. Beneficially, the zero-clearance optical receptacle further includes a slot that receives a biasing element, such as a spring, that biases the optical fiber ferrule toward the V-groove. Suitable biasing elements include a leaf spring and a roll-pin tubular spring. Also beneficially, the zero-clearance optical receptacle includes a front end that accurately positions the optical fiber ferrule in the zero-clearance receptacle. Beneficially, the zero-clearance optical receptacle is fabricated from the same material (typically a ceramic such as Zirconia) that the optical fiber ferrule is comprised of.

An optical coupler according to the principles of the present invention includes a body having a channel that receives a zero-clearance optical receptacle. Beneficially, the zero-clearance optical receptacle itself is dimensioned to receive an optical fiber ferrule on an internally fluted V-groove formed by two surfaces. The zero-clearance optical receptacle beneficially includes a biasing feature for biasing the optical fiber ferrule toward the V-groove. The optical coupler body further includes an opening for enabling light to pass between an optical element (such as a VCSEL or a photo-receptor) and a single mode optical fiber retained in the optical fiber ferrule. Beneficially, the optical coupler further includes a lens for focusing light to or from the optical element to the single mode optical fiber. The optical coupler can also include a housing for retaining an optical element.

A zero-clearance optical receptacle according to the principles of the present invention can be implemented by extruding a tube through a die so that an inner channel is formed with two surfaces that define a V-groove. Additionally, a slot is beneficially formed for a biasing element. Preferably, the zero-clearance optical receptacle is dimensioned to receive a 1.25 or a 2.5 mm nominal diameter Zirconia optical fiber ferrule. Preferably, the zero-clearance optical receptacle is fabricated from the same material (typically a ceramic such as Zirconia) that the optical fiber ferrule is comprised of. This is important since the V groove design is inherently rotational asymmetric, thus without close temperature coefficient of thermal expansion matching radial drift of a retained optical fiber could result.

Additional features and advantages of the invention will be set forth in the description which follows, and in part will be apparent from that description, or may be learned by practice of the invention. The objectives and other advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to various embodiments of the present invention, examples of which are illustrated in the accompanying drawings.

Figure 1:
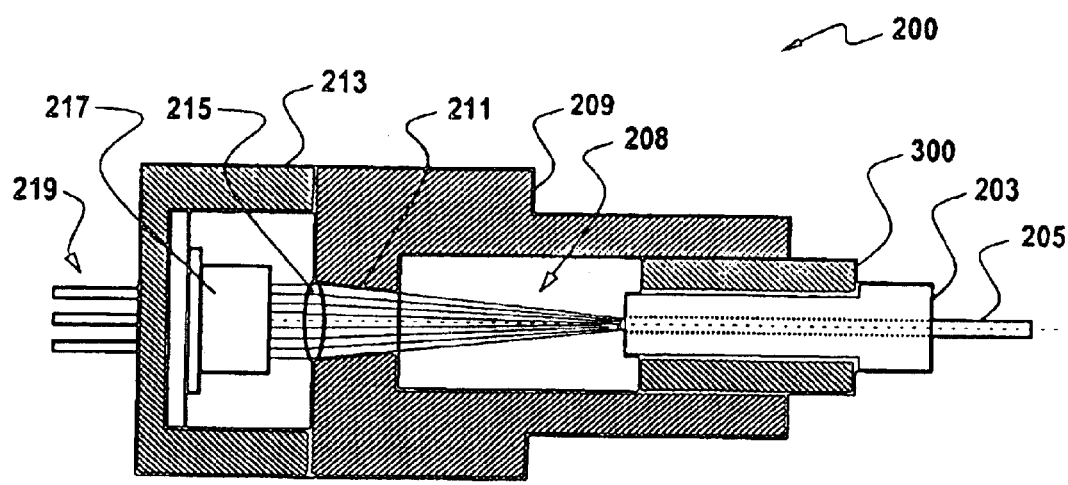
FIG. 1 illustrates an optical coupler that is in accord with the principles of the present invention.

FIG. 1 illustrates an optical coupler 200 that is in accord with the principles of the present invention. That optical coupler includes a body 209 that has a central channel 208. The central channel 208 is dimensioned to receive a zero-clearance optical receptacle 300, which is described in more detail subsequently. In turn, the zero-clearance optical receptacle 300 receives an optical fiber ferrule 203 that retains an optical fiber 205.

Still referring to FIG. 1, the optical coupler 200 includes an opening 211 that is axially aligned with the central channel 208. One end of the opening 211 is dimensioned to receive a lens 215. The optical coupler 200 further includes a base 213 that receives an optical element 217 having electrical leads 219. The optical element 217 can be a light emitter, such as a VCSEL, or an optical sensor, such as a photo-diode. The base 213 attaches to the body 209 such that the relative positions of the optical element 217 and the lens 215 are fixed. To that end, the elements that affect alignment have similar, beneficially identical, coefficients of thermal expansion.

Still referring to FIG. 1, in operation, the optical fiber 205 is rigidly connected to the optical fiber ferrule 203, beneficially using a suitable epoxy or other type of adhesive. The optical fiber ferrule 203 is then inserted into the zero-clearance optical receptacle 300. The positions of the zero-clearance optical receptacle 300 and/or the base 213 are then adjusted such that the focal point of the lens 211 is properly positioned relative to the optical fiber 205. Thus, the lens 215 couples light to or from the optical element 217 with the optical fiber 205. Once the position of the zero-clearance optical receptacle 300 and/or the base 213 are fixed in the central channel 208 (such as by epoxy bonding or laser weld joining), the optical fiber ferrule 203 can be repeatedly removed from and plugged into the zero-clearance optical receptacle 300.

Figure 2:
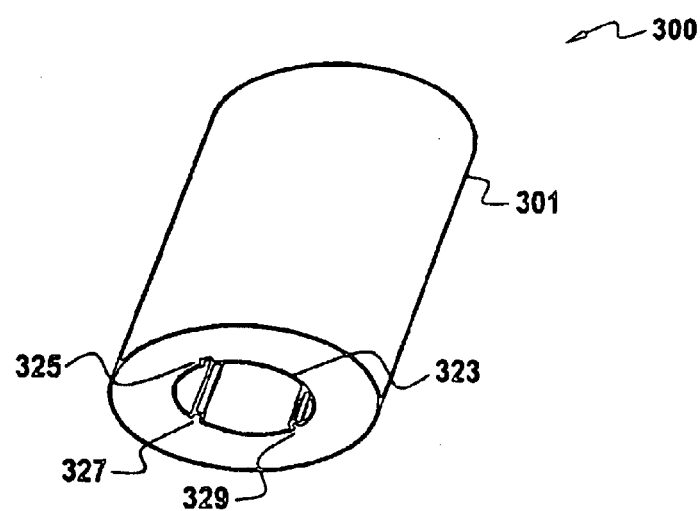
FIG. 2 illustrates a first embodiment zero-clearance optical receptacle that is in accord with the principles of the present invention and that is suitable for use in the optical coupler of FIG. 1.

FIG. 2 illustrates one embodiment of the zero-clearance optical receptacle 300. As shown, the zero-clearance optical receptacle 300 includes a cylindrically shaped body 301 having a central, generally cylindrically shaped inner opening 323. The inner opening 323 defines a first inwardly protruding leg 327 having a first top surface, a second inwardly protruding leg 329 having a second top surface, and a slot 325. The slot 325 and the legs 327 and 329 beneficially extend along the full length of the inner opening 323. In operation, the legs 327 and 329 form a V-groove that contacts the optical fiber ferrule 203 when the optical fiber ferrule 203 is inserted into the zero-clearance receptacle 300.

By V-groove what is meant is not a V-shape, rather what is referred to is the physical action of a V, top surfaces with a relieved section between the top surfaces. Thus, the top surfaces contact the inserted element, while the relieved middle section enables the inserted element to rest on the top surfaces. Thus the V is defined by the top surface contact points and by either the bottom of the relieved mid section or by the bottom of the inserted element. The slot 325 enables the insertion of a slotted wedge or a thin, spring element such as a round spring rod. Such elements bias the optical fiber ferrule 203 toward the legs 327 and 329.

The zero-clearance optical receptacle 300 uses the fundamental mechanical action of a V groove to consistently align the end of the optical fiber 205 held within the optical ferrule 203 with the optical element 217, plug-in after plug-in. The key or spring (such as a thin, round spring rod) inserted into the slot 325 biases the optical fiber ferrule 203 into position to avoid or eliminate positional errors.

Figure 3:
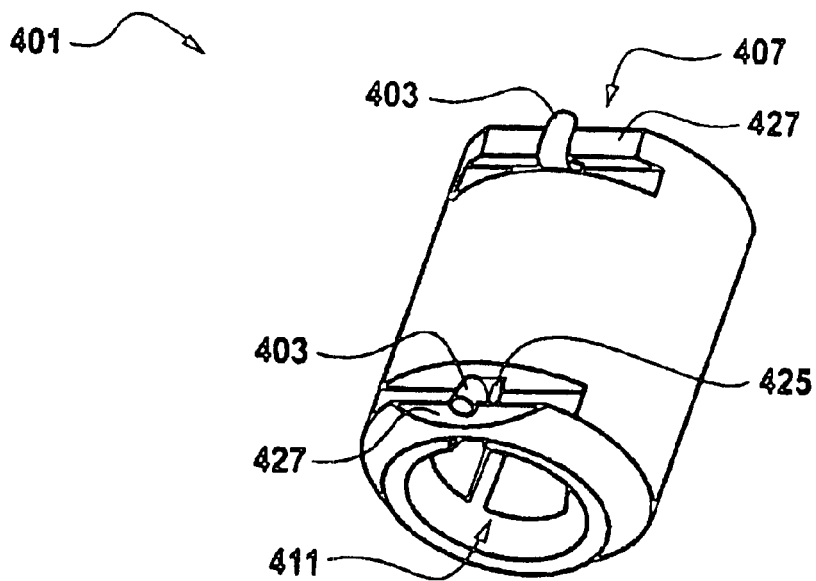
FIG. 3 illustrates a top down isometric view of a second embodiment zero-clearance optical receptacle that is in accord with the principles of the present invention and that is suitable for use in the optical coupler of FIG. 1.
Figure 4:
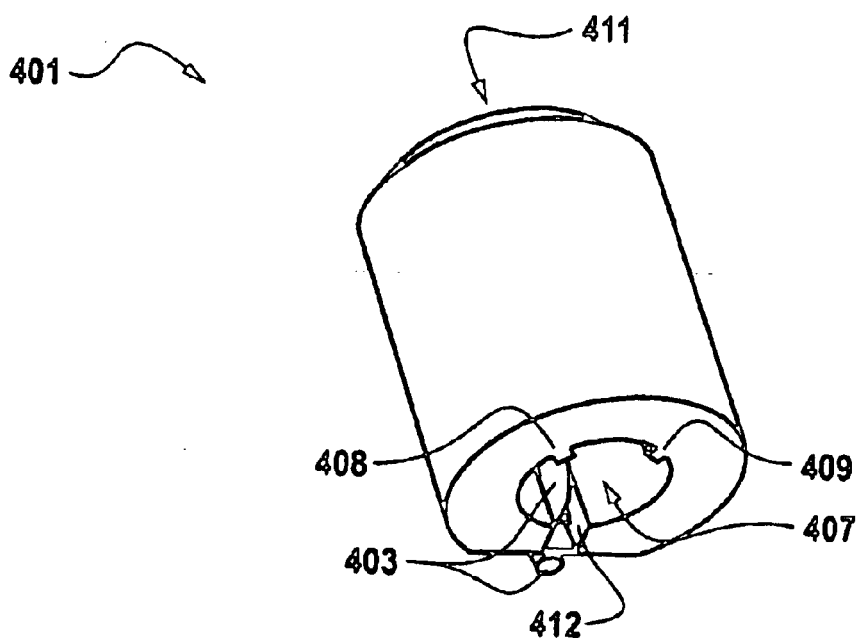
FIG. 4 illustrates a bottom-up isometric view of the zero-clearance optical receptacle illustrated in FIG. 3.

While the foregoing zero-clearance optical receptacle 300 is highly advantageous, another zero-clearance optical receptacle suitable for use in the optical coupler 200 is the zero-clearance optical receptacle 401 illustrated in FIGS. 3 and 4. It should be understood that the zero-clearance optical receptacle 401 could be used in place of the zero-clearance optical receptacle 300 shown in FIG. 1.

As shown in FIGS. 3 and 4, the zero-clearance optical receptacle 401 includes a generally cylindrically shaped body 407 that includes a central, generally cylindrically shaped inner opening 411. The inner opening 411 defines a first inwardly protruding leg 408 having a first surface, a second inwardly protruding leg 409 having a second surface, and an inner slot 412.

Still referring to FIGS. 3 and 4, the body 407 includes two openings 425 that pass through body and the slot 412. The body 407 also includes two flat surfaces 427 that are adjacent the openings 425 and that are depressed below the outermost surface of the body 407. The zero-clearance optical receptacle 401 further includes a spring 403 that fits into the slot 412, that passes on each end through an opening 425, and that rests on the flat surfaces 427. The spring 403 is dimensioned such that at least part of the spring 403 extends out of the slot 412 toward the center of the inner opening 411 when an optical fiber ferrule 203 is not inserted into the inner opening 411. However, the spring 403 is further dimensioned such that the optical fiber ferrule 203 can be inserted into the inner opening 411. The spring 403 biases the optical fiber ferrule 203 against the legs 408 and 409.

The particular implementations shown in the Figures may be adapted to many different connector designs to enable economical and flexible optical connectors and a wide range of assembly/joining techniques, specifically including laser welding.

Optical receptacles according to the principles of the present invention are beneficially comprised of the same material (preferably the ceramic material Zirconia) that the optical fiber ferrule is comprised of. This will provide highly accurate matching of the coefficients of thermal expansion of the materials that significantly impact on alignment of the optical fiber 205 with the optical element 217. Thus, a zero-clearance optical receptacle is fabricated to form a channel with two surfaces that define a V-groove and with a slot. Preferably, the zero-clearance optical receptacle is dimensioned to receive either a 1.25 or a 2.5 mm nominal diameter Zirconia optical fiber ferrule.

The embodiments and examples set forth herein are presented to explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. An optical receptacle comprised of a body having an inner opening with a V-groove defined by a first inwardly protruding leg having a first top surface and by a second inwardly protruding leg having a second top surface;
    wherein the inner opening and the V-groove are dimensioned to receive an optical ferrule having an optical fiber such that the optical ferrule rests on the first top surface and on the second top surface.

2. The optical receptacle according to claim 1, wherein the first and second legs extend along the inner opening.

3. The optical receptacle according to claim 1, wherein the inner opening further includes an elongated slot in the body.

4. The optical receptacle according to claim 3, further including a bias element in the slot.

5. An optical receptacle comprised of:
    a body having an inner opening with a V-groove defined by a first inwardly protruding leg having a first top surface and a second inwardly protruding leg having a second top surface, said body further including a slot that extends along the inner opening; and
    a bias element that is at least partially within the slot;
    wherein the inner opening and the V-groove are dimensioned to receive an optical ferrule having an optical fiber such that the optical ferrule rests on the first top surface and on the second top surface, and wherein the bias element is for biasing the optical ferrule toward the V-groove.

6. An optical receptacle according to claim 5, wherein the body further includes at least one opening that passes through the body, and at least one flat surface that is adjacent the opening, and wherein the bias element passes through the opening and contacts the flat surface.

7. An optical receptacle according to claim 6, wherein the bias element is a spring that is dimensioned such that at least part of the spring extends out of the slot toward the center of the inner opening.

8. The optical receptacle according to claim 7, wherein the spring is a roll spring.

9. An optical coupler comprised of:
    a coupler body having a central channel and an opening that is axially aligned with the central channel;
    a zero-clearance optical receptacle received in the central channel;
    an optical fiber ferrule received in the zero-clearance optical receptacle, said optical fiber ferrule retaining an optical fiber;
    a base attached to the coupler body;
    an optical element retained in the base such that the optical element is optically aligned with the optical fiber;
    wherein the zero-clearance optical receptacle has a receptacle body with an inner opening having a V-groove defined by a first inwardly protruding leg with a first top surface and by a second inwardly protruding leg with a second top surface, wherein the receptacle body fits within the central channel, and wherein the V-groove radially locates the optical fiber at a fixed position relative to the optical element.

10. The optical coupler according to claim 9, further including a lens disposed between the optical element and the optical fiber.

11. The optical coupler according to claim 9, wherein the optical element is a VCSEL.

12. The optical coupler according to claim 9, wherein the coupler body and the zero-clearance coupler receptacle are comprised of the same material.

13. The optical coupler according to claim 12, wherein the coupler body and the zero-clearance coupler receptacle are comprised of Zirconia.

14. The optical coupler according to claim 9, wherein the first and second legs extend along the inner opening.

15. The optical coupler according to claim 9, wherein the receptacle body further includes an elongated slot.

16. The optical coupler according to claim 15, further including a bias element in the elongated slot.

17. An optical coupler according to claim 9, wherein the receptacle body includes a slot that extends along the inner opening, a radial opening that passes through the receptacle body, and at least one flat surface that is adjacent the radial opening.

18. An optical coupler according to claim 17, further including a bias element that passes through the radial opening and contacts the flat surface.

19. An optical coupler according to claim 18, wherein the bias element is a spring that is dimensioned such that at least part of the spring extends out of the slot toward the center of the inner opening.

20. The optical coupler according to claim 19, wherein the spring is a roll spring.

21. The optical coupler according to claim 19, wherein the spring biases the optical ferrule toward the first and second legs.

22. An optical coupler, comprised of:
- a zero-clearance optical means;
- a coupler means for retaining said zero-clearance optical means;
- an optical fiber ferrule means received in the zero-clearance optical receptacle means, said optical fiber ferrule means including an optical fiber;
- a base means attached to said coupler means, said base means for retaining an optical element such that said optical element is optically aligned with said optical fiber;
- wherein the zero-clearance optical receptacle means includes a receptacle body with an inner opening having a V-groove that is defined by a first inwardly protruding leg with a first top surface and by a second inwardly protruding leg with a second top surface, wherein the V-groove radially locates the optical fiber at a fixed position relative to the optical element.

* * * * *

UNITED STATES PATENT AND TRADEMARK OFFICE
CERTIFICATE OF CORRECTION

PATENT NO. : 6,885,797 B2  Page 1 of 1
APPLICATION NO. : 10/347789
DATED : April 26, 2005
INVENTOR(S) : Lee et al.

It is certified that error appears in the above-identified patent and that said Letters Patent is hereby corrected as shown below:

<u>Column 4</u>
Line 5, change "lens 211" to --lens 215--
Line 51, change "FIG. 1" to --FIG. 2--

Signed and Sealed this

Seventh Day of August, 2007

JON W. DUDAS
*Director of the United States Patent and Trademark Office*